Oct. 3, 1950
A. C. BECKEL ET AL
2,524,037
PROCESS FOR THE UNINTERRUPTED RECIRCULATION
OF UNREFINED ALCOHOLIC FATTY OIL SOLVENT
Filed Jan. 15, 1948
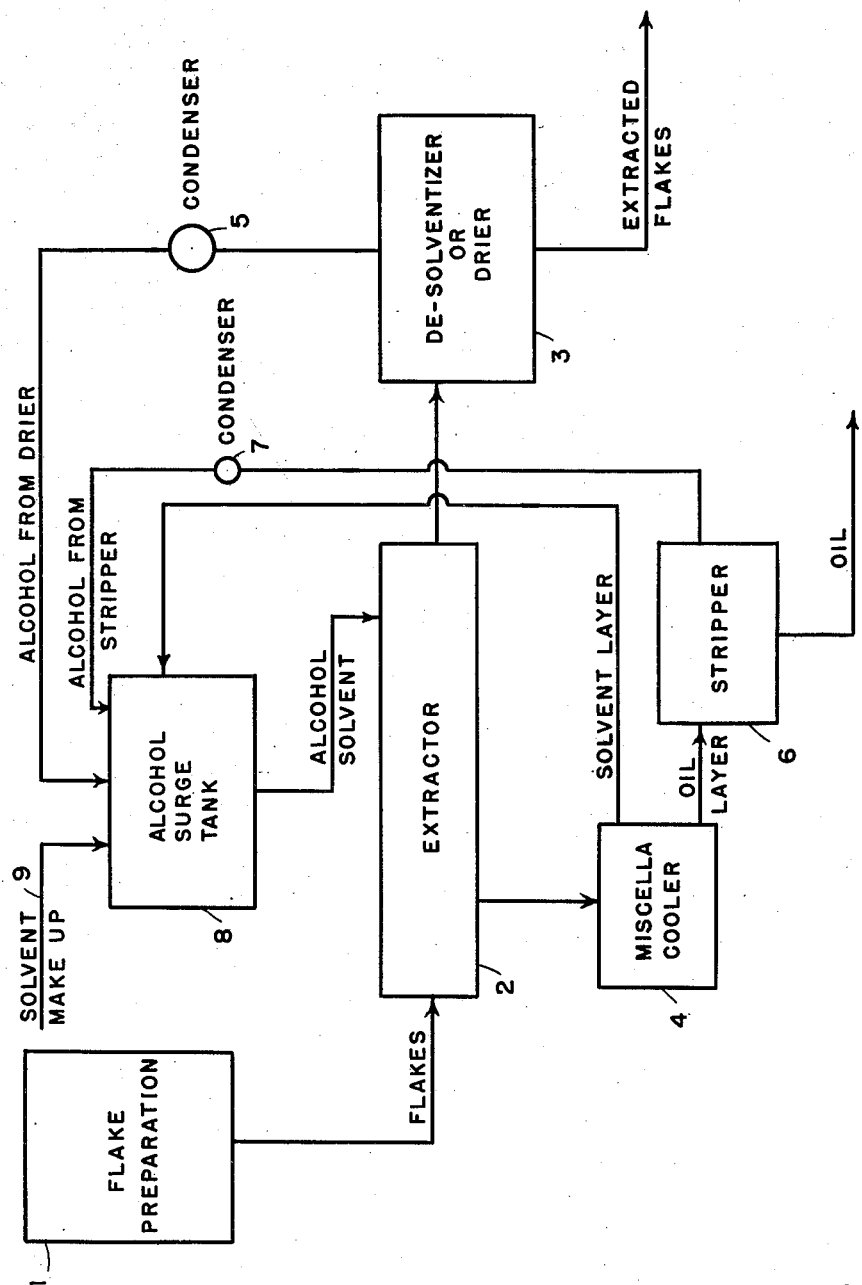
Inventors
A. C. BECKEL
J. C. COWAN
P. A. BELTER
By
H. R. Foss
L. M. Mantell Patented Oct. 3, 1950

2,524,037

UNITED STATES PATENT OFFICE 2,524,037

PROCESS FOR THE UNINTERRUPTED RECIRCULATION OF UNREFINED ALCOHOLIC FATTY OIL SOLVENT

Arthur C. Beckel and John C. Cowan, Peoria, and Paul A. Belter, Pekin, Ill., assignors to United States of America as represented by the Secretary of Agriculture Application January 15, 1948, Serial No. 2,535

1 Claim. (Cl. 260—412.4)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This application is a continuation-in-part of our abandoned application Serial No. 684,914 filed July 19, 1946.

This invention relates to an improvement in processes of extracting fatty oils from vegetable materials, such as the seeds and nutmeats group comprising soybeans, cottonseed, flaxseed, peanuts, tung nuts, babassu meats, coconut meats, oiticica seed, wheat germ, corn germ, rapeseed, and sunflower seed. In particular, it relates to a process of extracting the oils with a lower alcohol, specifically ethyl alcohol, the removal of the oils from the alcohol by cooling, and re-using the alcohol without further refinement to extract an unlimited number of successive batches of oil-bearing vegetable material.

Earlier patents and practice of the art have been directed to the recirculation of the alcoholic liquor through the original batch of oil-bearing material until the oil is removed. It has been the general belief of those skilled in the art of extraction of vegetable oils with ethyl alcohol or alcoholic solutions that the alochol could not be used on many successive batches of oil-bearing vegetable material because the rapid and continuous accumulation of dissolved substances other than oil would interfere with the extraction of oil.

This invention is based upon our discovery that the alcoholic solvent used in such an alcoholic extraction process can tolerate an accumulated amount of non-oil solubles and still be a very efficient solvent. We have found that the removal of spent materials in the extraction process effects sufficient removal of used solvent, entrained with the wet flakes, to render bleed-offs unnecessary. This solvent entrained with the flakes carries with it an amount of non-oil solubles equal to the amount dissolved by one pass of the circulating solvent at equilibrium conditions, that is, after prolonged recirculation. Under these equilibrium conditions, the alcoholic solvent, although containing an accumulated constant amount of non-oil solubles, still acts as a very efficient solvent for the oil in the flakes.

As the number of passes, in the case of continuous extraction processes, or the number of successive extractions, in the case of batch processes, increases the content of the non-oil solubles in the solvent increases. If the wet flakes are removed from the process and dried in a drier, and the quantity of alcohol replaced by fresh alcohol, this content of non-oil solubles cannot build up indefinitely. A maximum is finally reached at which the overall rate of solution is equaled by the rate of removal of the solvent entrained by the wet flakes. The non-oil solubles removed in the solvent along with the wet flakes are deposited upon the flakes in the drier.

The number of passes or successive extractions required before this state of equilibrium is the reciprocal of the ratio of solvent to solid used in the process.

Utilizing these discoveries, we have invented a process whereby the alcoholic oil solvent may be circulated through innumerable successive batches of oil-bearing vegetable material or may be continuously returned to a continuously operating extractor to which the vegetable material is continuously fed without the necessity of refining solvent beyond the removal of the extracted oil by cooling. It is obvious that this process will be possible only with those alcoholic extraction processes in which the alcohol does not require dehydration. Such permissible processes are those in which the oil-bearing vegetable material is reduced in moisture to a percentage slightly below that at which the vegetable material and the alcoholic solvent are in equilibrium as far as the transfer of moisture is concerned. Except for the above restriction, the extraction may be carried out in any of the known ways: that is, it may be carried out under increased pressure or at atmospheric pressures and with any desired ratio of solvent to solid.

Reference is made to the accompanying drawing which is a flow sheet of a continuous extraction process according to the present invention. Fresh flakes are fed from 1 into the extractor 2 containing an alcoholic solvent. Assuming for the sake of discussion that the equilibrium has been reached and that the ratio of solid to solvent is 6:1, the solvent in the extractor contains an accumulated amount of non-oil solubles which amount has become constant through prolonged operation. The wet beans coming from the extractor pass directly to the drier 3 in which the solvent is evaporated, condensed at 5 and returned to the extractor. During the evaporation the non-oil solubles present in the solvent are deposited on the beans in an amount equal to the non-oil solubles that were removed from the beans in the extractor. Nothing is permanently removed from the beans but the oil itself. The solvent bearing the oil goes from the extractor to the cooler in which the oil is separated, and the solvent freed from oil is returned to the extractor. A small amount of make-up solvent is occasionally added to the process at 9 in order to replace unavoidable handling losses of the solvent. If desired, the separated oil layer may be stripped of its alcohol content in stripper 6, by any conventional means, and, after condensing in 7, recycled to the alcohol tank 8 and thence to the extractor 2.

An example of one method of carrying out this invention follows: Cleaned soybeans, with or without hulls, are cracked and flaked, and the flakes dried to below 3 percent moisture content at 1. These flakes are fed into a continuously operating extractor 2 at such a rate that the solid is in contact for about one hour with boiling 95 percent ethyl alcohol, flowing in the opposite direction, using a solvent to solid ratio of 6:1.

The emerging hot solution of oil, carbohydrates, lecithin, coloring matter, and other dissolved material is cooled to room temperature (about 25° C.) in 4, when the oil comes out of solution, settles, and is separated. The supernatant alcoholic solution which is cloudy from separated finely divided solids is conveyed into a preheater and then back into the extractor. The wet flakes emerging from the extractor and passing into the drier 3 hold a quantity of solvent equal to $1/15$ of the total solvent used in the extraction. After 15 extractions, the solubles deposited in the drier equal those dissolved during the passage through the extractor, and thereafter the concentration of materials remaining in solution after cooling remains constant.

The solvent contains about 9 percent total solubles after the oil has been removed, exclusive of water. The alcohol content of the re-circulated solvent is about 84.2 percent.

An economic advantage of this process lies in the fact that the normal procedure for recovering solvent is sufficient, and that no additional energy whatever is required for refining, as is the case with other alcoholic extraction methods or with any other solvent used in oil extraction processes.

Stated otherwise, our invention utilizes the drying of the flakes, a heretofore relatively insignificant step in oil extraction processes, as a significant element in the removal of non-oil solubles from the solvent. Our process may be termed a "no-distillation" process, since no solvent is refined by a separate distillation, the only evaporation being that employed in the drying of the flakes.

Obviously the solvent recovered from the drier need not be recirculated to the process but may be recovered and used in any way desired. If it is not returned, an equal amount must be added as make-up. We do not limit our invention to the example given, since one skilled in the art could adapt the process to many other conditions.

Having thus described our invention, we claim:

A continuous process of extracting alcohol-soluble oils from soybean flakes, comprising: subjecting soybean flakes, dried to below 3% moisture content, to continuous countercurrent extraction with boiling 95% ethyl alcohol, the flakes being fed at such a rate that the flakes are in contact with the boiling alcohol for about an hour, the solvent to solid ratio being 6:1; cooling the emerging hot solution of oil, carbohydrates, lecithin and coloring matter to separate the oil; recycling the supernatant alcoholic solution, which is cloudy from separated finely divided solids, back to the extraction of fresh flakes, after reheating; this recycling of the alcoholic solution without purification being for a substantially unlimited number of times; draining the flakes and removing the drained wet flakes from the extraction, the wet flakes holding a quantity of alcohol equal to $1/15$ of the total alcohol used in the extraction; drying the flakes to vaporize the alcohol and to deposit non-oil solubles present in the alcohol upon the flakes; recycling the so vaporized alcohol to the extraction step; the extraction system having no alcohol bleed-off other than that entrained upon the drained flakes.

ARTHUR C. BECKEL.
JOHN C. COWAN.
PAUL A. BELTER.

REFERENCES CITED

The following references are of record in the file of this patent:

UNITED STATES PATENTS

| Number | Name | Date |
|---|---|---|
| 2,377,975 | Singer et al. | June 12, 1945 |

OTHER REFERENCES

Sato et al., Abstracts from Report of the Central Lab., South Manchuria Railway Co. (Dairen) (1929), pp. 1 to 7.